UNITED STATES PATENT OFFICE.

ANSIL MOFFATT, OF INDIANAPOLIS, INDIANA, ASSIGNOR TO WILLIAM N. GATES, OF INDIANAPOLIS, INDIANA.

PROCESS OF MAKING DYE.

1,066,641. Specification of Letters Patent. Patented July 8, 1913.

No Drawing. Application filed July 21, 1910. Serial No. 573,073.

*To all whom it may concern:*

Be it known that I, ANSIL MOFFATT, of Indianapolis, county of Marion, and State of Indiana, have invented a certain new and useful Process of Making Dye; and I do hereby declare that the following is a full, clear, and exact description thereof.

My invention is the process of making a solution consisting of an anilin dye or color of any desired hue and dissolved agar-agar or other seaweed or seaweed extract.

Heretofore in compositions for dyeing with anilin dyes, the dyes have been used either in a pure state, or admixed with various mordanting or fixing adjectives, such as copper sulfate, tin salts, bichromates or chromates, paranitranilin and the like. When used in a pure state, the dyes lack fastness to water in many instances and where fastness is secured by various chemicals, as above specified, either special vessels are required or operations necessitated making fast dyeing beyond the capacity, willingness or means of the amateur, such as the housewife or student.

To obviate these objections I have invented a mixture of dissolved seaweed, such as agar-agar, with anilin dyes of various or chosen hues and the process of stabilizing anilin dye solutions as herein set forth. The seaweed extract or agar-agar is dissolved in water and the desired anilin color is added in substantially the proportions of six parts of the anilin color to one part of agar-agar, and sufficient water so that the resulting composition, when cool, forms a rather firm, gelatinous mass. The resulting dye is then easily packed in cans, tubes or other commercial packages, ready for immediate and easy preparation for use, and permanent under even extreme conditions of climate, handling and the like.

When desired to use my composition, it may be dissolved in boiling water to a proper degree of strength, and this solution can be used as a dye-bath, either hot or cold, according to the character of the material to be dyed, or characteristic of the dye present, or other exigency. Materials dyed with my composition are, after dyeing and other usual operations, fast to water. The amateur, such as the housewife or art student, is, therefore, saved the trouble and annoyance of using chemical adjectives or mordants and needs no experience to color materials with my composition, such as is necessary with the other sort of dyes mentioned.

I claim as my invention:

1. The process of stabilizing anilin dye solutions, which process consists in dissolving agar agar in water, and adding anilin dye to such solution, substantially as set forth.

2. The process of stabilizing anilin dye solutions, which process consists in dissolving agar agar in water, adding anilin dye to such solution in substantially the proportion of six parts anilin dye to one part of agar agar, and then forming the same into a gelatinous mass.

In witness whereof, I have hereunto affixed my signature in the presence of the witnesses herein named.

ANSIL MOFFATT.

Witnesses:
 G. H. BOINK,
 J. H. WELLS.

Copies of this patent may be obtained for five cents each, by addressing the "Commissioner of Patents, Washington, D. C."